United States Patent
Satoh et al.

(10) Patent No.: US 8,186,149 B2
(45) Date of Patent: May 29, 2012

(54) METHOD FOR CONTROLLING $NO_x$ REDUCTION SYSTEM

(75) Inventors: Naohiro Satoh, Saitama (JP); Osami Yamamoto, Saitama (JP); Koichi Inaba, Saitama (JP); Hiroshi Ohno, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 609 days.

(21) Appl. No.: 12/375,315

(22) PCT Filed: Jul. 30, 2007

(86) PCT No.: PCT/JP2007/064856
§ 371 (c)(1),
(2), (4) Date: Jan. 27, 2009

(87) PCT Pub. No.: WO2008/015992
PCT Pub. Date: Feb. 7, 2008

(65) Prior Publication Data
US 2009/0308054 A1 Dec. 17, 2009

(30) Foreign Application Priority Data
Jul. 31, 2006 (JP) .................................. 2006-209054

(51) Int. Cl.
*F01N 3/00* (2006.01)
(52) U.S. Cl. ................ 60/285; 60/274; 60/295; 60/297; 60/301
(58) Field of Classification Search .............. 60/274, 60/285, 286, 295, 297, 301, 303; 422/169, 422/171, 172, 177, 180
See application file for complete search history.

(56) References Cited

U.S. PATENT DOCUMENTS

| | | | |
|---|---|---|---|
| 6,119,452 A * | 9/2000 | Kinugasa et al. | 60/285 |
| 6,176,079 B1 * | 1/2001 | Konrad et al. | 60/274 |
| 6,413,483 B1 | 7/2002 | Brisley et al. | |
| 6,732,507 B1 * | 5/2004 | Stanglmaier et al. | 60/285 |
| 7,332,135 B2 * | 2/2008 | Gandhi et al. | 422/177 |
| 7,674,743 B2 * | 3/2010 | Gandhi et al. | 502/302 |
| 7,685,813 B2 * | 3/2010 | McCarthy, Jr. | 60/295 |

FOREIGN PATENT DOCUMENTS

| | | |
|---|---|---|
| EP | 0 952 321 A2 | 10/1999 |
| EP | 1 685 891 A1 | 8/2006 |
| JP | 6-316416 A | 11/1994 |
| JP | 9-10594 A | 1/1997 |

(Continued)

*Primary Examiner* — Thomas Denion
*Assistant Examiner* — Diem Tran
(74) *Attorney, Agent, or Firm* — Arent Fox LLP

(57) ABSTRACT

A $NO_x$ reduction system comprises $NO_x$ treatment catalyst and air-fuel ratio control switch for changing the air-fuel ratio of an exhaust gas to a lean or rich state. The $NO_x$ treatment catalyst comprises at least a first catalyst layer containing a solid acid catalyst capable of adsorbing ammonia and a second catalyst layer containing a noble metal and a cerium oxide material. The second and the first catalyst layer are stacked in that order on a carrier, and the first catalyst layer constitutes the uppermost layer. $NO_x$ is passed through the first catalyst layer in the lean state and is temporarily stored in the second catalyst layer. Thereafter, in the rich state, $NO_x$ is converted to $NH_3$ and is restored in the first catalyst layer. When the state is again returned to the lean state, $NH_3$ is converted to nitrogen which is finally released from the first catalyst layer.

10 Claims, 9 Drawing Sheets

FOREIGN PATENT DOCUMENTS

| | | |
|---|---|---|
| JP | 2600492 B2 | 1/1997 |
| JP | 11-294226 A | 10/1999 |
| JP | 2000-64821 A | 2/2000 |
| JP | 2002-506500 A | 2/2002 |
| WO | WO 93/07363 A1 | 4/1993 |
| WO | WO 2005/044426 A1 | 5/2005 |

* cited by examiner

METHOD FOR CONTROLLING NO$_x$ REDUCTION SYSTEM

CROSS-REFERENCE TO RELATED APPLICATION

This application is a National Stage entry of International Application No. PCT/JP2007/064856, filed Jul. 30, 2007. The disclosure of the prior application is hereby incorporated herein in its entirety by reference.

TECHNICAL FIELD

The present invention relates to a method for controlling a NOx reduction system that can, for example, remove NOx in exhaust gas from a vehicle with a satisfactorily high efficiency and, in particular, relates to a NOx reduction system that can remove NOx with a satisfactorily high efficiency even, under low-temperature operating conditions as in diesel cars.

BACKGROUND ART

Conventionally, a NOx reduction system that is capable of efficiently reducing NOx (nitrogen oxide) in exhaust gas discharged from a vehicle and the like has been considered. Most importantly, in diesel cars, the reduction of NOx has been a major concern, as well as the reduction of PM (particulate matter).

Normally, in diesel cars, a diesel oxidation catalyst (DOC) and a diesel particulate filter (DPF) are arranged in the exhaust passage of the diesel engine. However, a combination of the conventional DOC and DPF alone will be insufficient if a further reduction of NOx is required in the future.

As such a method for further reducing NOx in the exhaust gas, for example, in Patent Document 1, an exhaust gas purification device for an internal combustion engine using a NOx absorbent. The NOx absorbent absorbs NOx while the air-fuel ratio of the exhaust gas is lean and releases the absorbed NOx when the oxygen concentration of the exhaust gas is lowered. Thus, the exhaust purification device releases the NOx absorbed while the air-fuel ratio of the exhaust gas is lean from the NOx absorbent when the oxygen concentration of the exhaust gas is lowered.

[Patent Document 1] Japanese Patent No. 2600492

DISCLOSURE OF THE INVENTION

Problems to be Solved by the Invention

However, the exhaust purification device as disclosed in Patent Document 1 uses alkali metals, alkali earth metals and the like as NOx absorbents. Also, a noble metal such as platinum is used for the oxidation of HC, CO, and NOx under lean conditions, and for the reduction of NOx under rich conditions. Thus, according to Patent Document 1, because strongly basic materials are used as NOx absorbent, a problem arises in that the activity of the noble metal is readily reduced and the NOx purifying performance is deteriorated, particularly at low temperature.

In addition, because strongly basic materials are used as NOx absorbents, the binding with SOx, which has higher acidity than NOx, becomes stronger. Therefore, there is also a problem in that regeneration after sulfur-poisoning requires a higher temperature, which makes low temperature catalyst regeneration more difficult.

In other words, the exhaust purification device of Patent Document 1 provides some desired effects when applied to gasoline engines operated primarily under high-temperature operating conditions; however, as with diesel engines, for example, if there are often operating ranges 300° C. or lower, the NOx reduction effect is insufficient.

The present invention is accomplished in view of the above problems, and has the object of providing a method for controlling a NOx reduction system that can remove NOx with satisfactorily high efficiency, even under low-temperature operating conditions as in diesel cars.

Means for Solving the Problems

The present inventors discovered that NOx reducing performance under low-temperature operating conditions was improved by combining a first catalyst layer including a solid acid catalyst capable of adsorbing ammonia, and a second catalyst layer including a noble metal and a cerium oxide-based material as a NOx treatment means, in which the first catalyst layer is stacked to be the uppermost layer, and by controlling the air-fuel ratio of exhaust gas to lean or rich by an air-fuel ratio control means, thereby coming to complete the present invention. More specifically, the present invention provides the following.

In a first aspect of the present invention, a control method of a NOx reduction system for treating NOx contained in exhaust gas from an internal combustion engine including: a NOx treatment means disposed in an exhaust passage from the internal combustion engine; and an air-fuel ratio control means for adjusting an air-fuel ratio of the exhaust gas to lean or rich, in which the NOx treatment means includes at least a first catalyst layer having a solid acid catalyst capable of adsorbing ammonia and a second catalyst layer having a noble metal and a cerium oxide-based material, the second catalyst layer and the first catalyst layer being stacked in that order on a carrier, the first catalyst layer configuring the uppermost layer; is characterized in that the air-fuel ratio control means is controlled in order to repeat at predetermined intervals the following Steps A and B of:

Step A: the air-fuel ratio control means making a lean condition, thereby making the NOx adsorb onto the second catalyst layers while being oxidized by the second catalyst layer (Step A1), and ammonia adsorbed onto the first catalyst layer in Step B being reduced to nitrogen and released (Step A2); and Step B: the air-fuel ratio control means making a rich condition, thereby converting NOx adsorbed in the Step A1 to ammonia by the second catalyst layer, and adsorbing the ammonia to the first catalyst layer.

According to the arrangement of the first aspect, the NOx treatment means includes at least the first catalyst layer having a solid acid catalyst capable of adsorbing ammonia and the second catalyst layer having a noble metal and a cerium oxide-based material, in which the second catalyst layer and the first catalyst layer are stacked in this order on a carrier, and the first catalyst layer constitutes the uppermost layer. The NOx treatment means is disposed in the exhaust passage from the internal combustion engine. The air-fuel ratio control means controls the air-fuel ratio of the exhaust gas passing through the NOx treatment means to be lean or rich. Therefore, the NOx treatment means operates as follows in association with this control to reduce NOx.

First, in the condition where the air-fuel ratio of the exhaust gas is made lean, NOx in the exhaust gas easily passes through the first catalyst layer of the upper layer, which is a solid acid catalyst, and reaches the lower second catalyst layer. Here, the NOx contacts the second catalyst layer, and is temporarily adsorbed on the second catalyst layer (temporary storage) while being oxidized by a noble metal such as platinum in the second catalyst layer.

Next, the air-fuel ratio of the exhaust gas is brought to a rich condition. Then, NOx adsorbed on the second catalyst layer is converted to ammonia by reaction with the hydrogen generated from a water gas shift reaction, and the ammonia moves to and is adsorbed on the first catalyst layer (re-storage). The re-storage can be easily performed as the first catalyst layer and the second catalyst layer are stacked to be adjacent.

The conversion to ammonia also progresses by being supplied to the second catalyst layer with at least a reducing component selected from the group consisting of a CO component, and HC component of the exhaust gas, and hydrogen generated from the CO and/or HC components contacting with the second catalyst layer. As a result, the NOx adsorbed on the second catalyst layer can be efficiently converted to $NH_3$.

Thereafter, for a second time, when the air-fuel ratio of the exhaust gas returns to lean, the ammonia re-stored on the first catalyst layer and NOx contained in the exhaust gas are converted to nitrogen and water via ammonia-selective catalytic reduction, and the nitrogen is released from the surface of the first catalyst layer. At this time, since the first catalyst layer is the uppermost layer, the reduced nitrogen is efficiently released from the uppermost surface. Moreover, at this time, the above-mentioned temporary storage also progresses simultaneously.

As described above, by repeating the lean/rich control of the exhaust gas at predetermined intervals, the catalyst stores NOx temporarily in the second catalyst layer and converts ammonia re-stored in the first catalyst layer into nitrogen and water, and releases them under lean conditions. On the other hand, the catalyst converts NOx stored temporarily to ammonia, and re-stores it in the first catalyst layer under rich conditions. Thus, the catalyst can continuously purify NOx. In addition, NOx reduction performance is improved as a cycle of the temporary storage of NOx, conversion to ammonia, re-storage of ammonia, reduction to nitrogen, and the release thereof occurs efficiently by having the layer configuration in which the uppermost layer is the first catalyst layer and the lower layer is the second catalyst layer. Moreover, the aforementioned effects will be hereinafter described in greater detail in the embodiments of the present invention.

In the present invention, "absorbing" of NOx is not performed as the NOx absorbent of the Patent Document 1 incorporating NOx, but "adsorbing" via a two-step process of temporary storage and re-storage is performed. In addition, strongly basic materials such as alkali-metals or alkali earth metals are not used. Accordingly, an unconventional beneficial effect are obtained in which the catalyst can remove NOx with satisfactorily high efficiency, even under low-temperature operating conditions primarily at 300° C. or lower as in diesel cars, without suffering from reduction in the activity of the noble metal catalyst at the low temperature.

The method for controlling in the above-mentioned Steps A and B is not particularly limited to that stated in the embodiments described later. For example, the maximum amount of NOx adsorption by the second catalyst layer is estimated in advance by an actual measurement or calculation, and the maximum amount of NOx adsorption or an amount attained by multiplying the maximum amount of NOx adsorption by a predetermined coefficient of 1 or less is set as a target value. On the other hand, for example, an actual absorption amount accumulated by an engine speed is measured as an integral absorption amount. Then, the engine is operated under lean conditions until the accumulated absorption amount reaches the target value, whereupon reaching the target value the operation is switched to rich conditions.

The lean condition herein indicates a condition in which the air-fuel ratio is high (i.e. a condition in which the fuel concentration is low), and the rich condition herein indicates a condition in which the air-fuel ratio is low (i.e. a condition in which the fuel concentration is high).

According to a second aspect of the present invention, in the control method of the NOx reduction system as described in the first aspect, the solid acid catalyst of the first catalyst layer is a zeolite-based catalyst.

According to the configuration of the second aspect, a zeolite-based catalyst is preferably used in the present invention because of being NOx-permeable and excelling in ammonia adsorption capability, as well as having relatively high heat-resistance. Moreover, it may also be preferable to use a zeolite-based catalyst which is ion-exchanged with a transition metal, such as Fe or Ce. Although the type of zeolite is not especially limited, mordenite, ZSM-5-type synthetic zeolite, β zeolite, or the like may be preferably exemplified.

According to a third aspect of the present invention, in the control method of the NOx reduction system as described in the first or second aspect, the first catalyst layer further includes an iron element and/or a cerium element.

According to the configuration of the third aspect, the exhaust gas purification performance, particularly NOx purification performance, improves by adding the iron element or the cerium element. In other words, it may be expected that the iron element adsorbs NOx and the reductant, and the cerium element adsorbs NOx as well as suppresses poisoning of the catalyst by the reductant because of its storage and release ability of oxygen.

According to a fourth aspect of the present invention, in the control method of the NOx reduction system as described in any one of first to third aspects, the second catalyst layer further contains heat-resistant inorganic oxide.

According to the configuration of the fourth aspect, the heat-resistant inorganic oxide is contained to enhance the efficiency of hydrogen formation caused by the water gas shift reaction at a temperature of 300° C. or higher. As a result, the conversion of NOx to ammonia under rich conditions can be performed more efficiently.

The noble metal as the catalytic active species is used so as to be carried on the heat-resistant inorganic oxide. The heat-resistant inorganic oxide is widely selectable from among inorganic oxides, such as zirconium oxide-based materials, alumina-based materials, zeolite-based materials, and silica-based materials, in addition to the cerium oxide-based material described in the above first aspect. The noble metal may be carried entirely on the heat-resistant inorganic oxide that forms the second catalyst layer and may also be carried on a particular inorganic oxide.

According to a fifth aspect of the present invention, in the control method of the NOx reduction system as described in the fourth aspect, the heat-resistant inorganic oxide is at least one material selected from the group consisting of a zirconium oxide-based material, alumina-based material, zeolite-based material, and silica-based material.

According to a sixth aspect of the present invention, in the control method of the NOx reduction system as described in the fifth aspect, the zirconium oxide-based material is zirconium oxide and/or a composite oxide of zirconium and a rare earth element.

According to a seventh aspect of the present invention, in the control method of the NOx reduction system as described in any one of the first to sixth aspects, the cerium oxide-based material in the second catalyst layer is a cerium oxide and/or a composite oxide of cerium and a rare earth element.

According to the configuration of the sixth aspect, by the use of zirconium oxide and/or composite oxide of zirconium and rare earth elements, preferably the composite oxide, the second catalyst layer facilitates the generation of hydrogen as a water gas shift catalyst to promote the formation of ammonia in the second catalyst layer. According to the configuration of the seventh aspect, by the use of cerium oxide and/or a composite oxide of cerium and rare earth elements, preferably cerium oxide and the composite oxide as the cerium oxide-based material, the adsorption of NOx to the second catalyst layer is promoted. Preferred rare earth elements may be at least one rare earth element selected from the group consisting of praseodymium (Pr), lanthanum (La), and neodymium (Nd).

According to an eighth aspect of the present invention, in the control method of the NOx reduction system as described in any one of the first to seventh aspects, the second catalyst layer is configured such that the content of the noble metal decreases gradually or stepwise from the first catalyst layer to the carrier.

According to the configuration of the eighth aspect, the formation of ammonia by way of the water gas shift reaction becomes predominant in the upper region (closer to the uppermost face) of the second catalyst layer because the noble metal content is high. On the other hand, the temporary storage of NOx becomes predominant in the lower region (closer to the carrier) because the noble metal content is low or no noble metal exists in this region. As a result, NOx reducing efficiency can be further improved.

Moreover, although a configuration in which "the content of the noble metal decreases gradually or stepwise from the first catalyst layer to the carrier" is not particularly limited, it may be configured such that the content of the noble metal may decrease gradually in the thickness direction, or such that the second catalyst layer may be composed of multiple layers, in which the content of the noble metal in each layer decreases stepwise. The configurations of the present invention also include a case in which the second catalyst layer has a layer containing substantially no noble metal at the side of the carrier.

According to a ninth aspect, in the control method of the NOx reduction system as described in any one of the first to eighth aspects, the internal combustion engine is a diesel engine.

According to the configuration of the ninth aspect, the control method of the NOx reduction system of the present invention is especially effective in removing NOx under low-temperature operating conditions, and therefore the method can be suitably used particularly for diesel engines in which a catalyst temperature becomes no greater than 300° C.

According to a tenth aspect of the present invention, in the control method of the NOx reduction system as described in the ninth aspect, a three-way catalyst (TWC), a diesel particulate filter (DPF), and the NOx treatment means are arranged in this order toward an exhaust direction of the exhaust passage, the NOx treatment means being separated from a diesel engine and arranged at a position that does not substantially receive a heat effect thereof.

In an eleventh aspect of the present invention, the control method of the NOx reduction system as described in the ninth or tenth aspect includes a temperature adjusting means capable of adjusting a temperature of the NOx treatment means to no greater than 400° C.

As described above, the control method of the NOx reduction system of the present invention is characterized in having a sufficient NOx purification capability under low-temperature operating conditions. Therefore, as in the configuration of the eleventh aspect, efficient NOx purification becomes possible by providing the temperature adjusting means capable of controlling the temperature to no greater than 400° C., and preferably no greater than 300° C. In addition, as in the configuration of the tenth aspect, sufficient NOx removal efficiency can be achieved, even if the NOx treatment means is separated from a diesel engine and arranged at a position that does not substantially receive a heat effect thereof. That is, the NOx treatment means capable of operating at a low temperature does not require a high temperature exceeding 400° C. Accordingly, as not necessary to utilize the heat from the engine, the NOx treatment means has flexibility for its arrangement. More specifically, the NOx treatment means of the present invention may be arranged, for example, under a floor of a vehicle, which indicates the NOx treatment means is characteristic in having a high flexibility of layout.

The following configurations may be considered as alternatives.

According to a twelfth aspect of the present invention, in a method for reducing NOx contained in exhaust gas from an internal combustion engine by a catalyst, the catalyst including a second catalyst layer having a cerium oxide-based material carrying a noble metal, and a first catalyst layer having a solid acid catalyst capable of adsorbing ammonia, layered in this order, the method is characteristic in that, under a condition where the air-fuel ratio of the exhaust gas is made lean, the NOx passes through the first catalyst layer to reach the second catalyst layer, and is once adsorbed and temporarily stored on the second catalyst layer while being oxidized by the noble metal. Then, in a condition where the air-fuel ratio of the exhaust gas is made to rich, NOx adsorbed on the second catalyst layer is converted to ammonia by reaction with the hydrogen generated from a water gas shift reaction, and the ammonia is moved to and is adsorbed on the first catalyst layer to be re-stored. Again, under the condition where the air-fuel ratio of the exhaust gas is made lean, the ammonia re-stored on the first catalyst layer and NOx contained in the exhaust gas are converted to nitrogen via ammonia-selective catalytic reduction, and the nitrogen is released from a surface of the first catalyst layer.

According to a thirteenth aspect of the present invention, in the method for reducing NOx as described in the twelfth aspect, the internal combustion engine is a diesel engine and a temperature of the catalyst can be held to be no greater than 400° C.

The methods according to the twelfth and thirteenth aspects are expansions of the control method of the NOx reduction system described in any one of the first to eleventh aspects as a simple method for reducing NOx. Thus, according to the invention of the twelfth aspect, a similar effect to the first aspect can be obtained. In addition, according to the configuration of the thirteenth aspect, a similar effect to the ninth and eleventh aspects can be obtained.

Effects of the Invention

According to the present invention, a control method of a NOx reduction system and a NOx reduction method, which can remove NOx with a satisfactorily high efficiency even in an operating range at a low catalyst temperature, can be provided. For this reason, the present invention can be suitably used for diesel cars.

PREFERRED MODE FOR CARRYING OUT THE INVENTION

Hereinafter, a method for controlling a NOx reduction system according to the present invention will be described in detail with reference to the accompanying drawings.

The control method of a NOx reduction system according to the present invention is such that NOx is reduced by controlling the NOx reduction system, which is equipped with a NOx treatment means arranged in an exhaust passage from an internal combustion engine and an air-fuel ratio control means for controlling the air-fuel ratio of the exhaust gas to lean or rich, and thus the air-fuel ratio of exhaust gas passing through the NOx treatment means to be lean or rich by way of the air-fuel ratio control means.

[Overall Configuration of NOx Reduction System]

Figure 1:
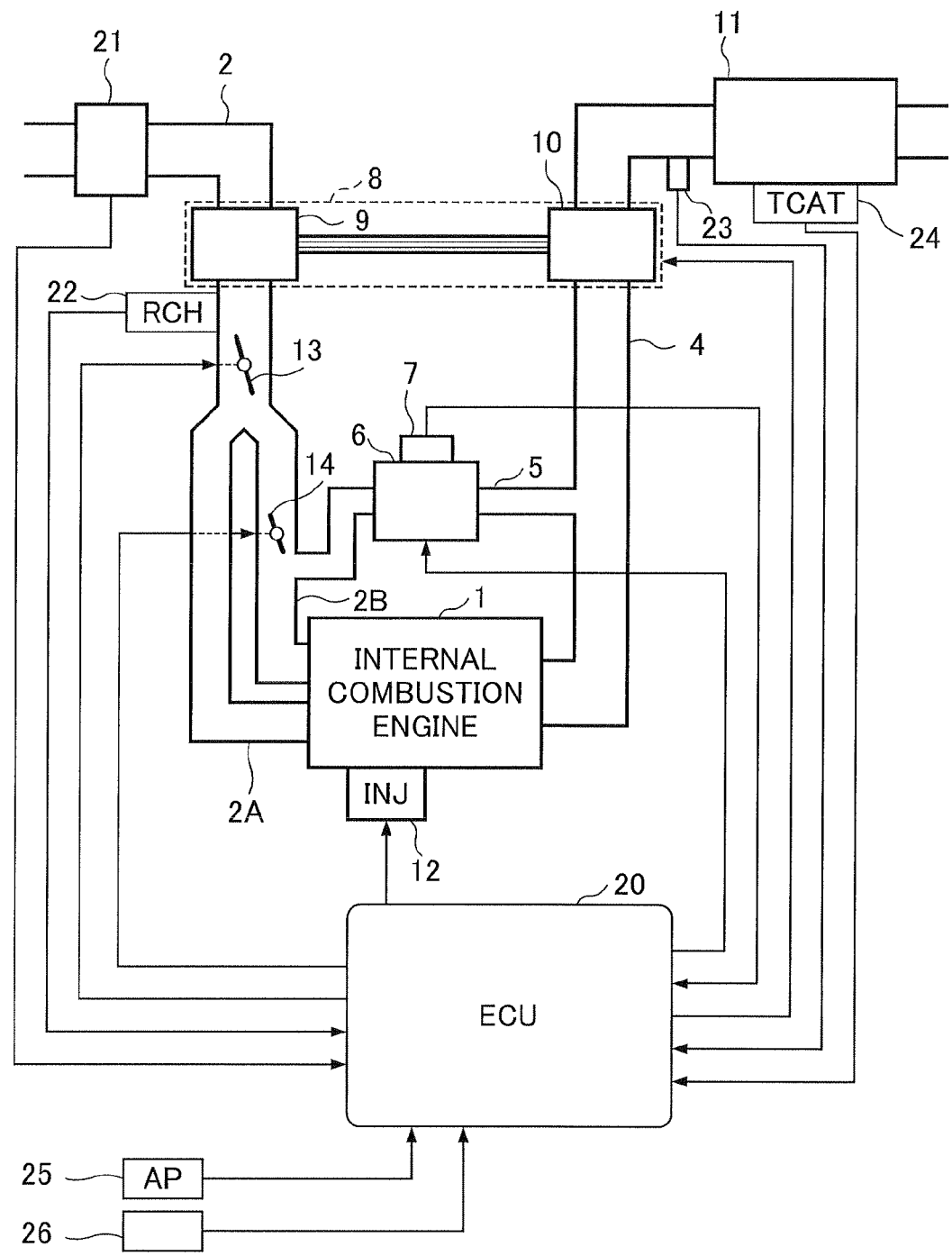
FIG. 1 is an overall view of a NOx reduction system according to a first embodiment of the present invention.

The NOx reduction system used in the present invention is configured with, as shown in FIG. 1, an engine 1, intake plumbing 2, intake ports 2A and 2B, an exhaust pipe 4, an exhaust gas recirculation passage 5, an exhaust gas recirculation control valve 6, a lift sensor 7, a turbocharger 8, a compressor 9, a turbine 10, a NOx purification device 11, fuel injectors 12, a throttle valve 13, a swirl control valve 14, an ECU 20, an air mass sensor 21, a charge pressure sensor 22, a proportional air-fuel ratio sensor 23, a catalyst temperature sensor 24, an accelerator sensor 25, and a crank angle position sensor 26.

The engine 1 is a diesel engine in which fuel is directly injected into cylinders, and is equipped with the fuel injector 12 in each engine cylinder. The fuel injector 12 is electrically connected to an electronic control unit (hereinafter referred to as "ECU"), and the timings of opening and closing the fuel injectors 12 are controlled by the ECU 20.

In addition, the engine 1 is equipped with the intake plumbing 2, the exhaust pipe 4, and the turbocharger 8, and the turbocharger 8 is equipped with the turbine 10 driven by kinetic energy of exhaust gas and the compressor 9 driven rotationally by the turbine 10 to compress the intake air.

The turbine 10 is equipped with a plurality of variable vanes (not shown) and configured to be capable of changing a turbine speed (rotational speed) by varying an opening of the variable vane (hereinafter referred to as a "vane opening"). The vane opening of the turbine 10 is electromagnetically controlled by the ECU 20. More particularly, the ECU 20 controls the vane opening by supplying a control signal, a duty ratio of which can be varied, to the turbine 10. When the vane opening is increased, an efficiency of the turbine 10 is improved, thereby increasing the turbine speed. As a result, a charge pressure is increased.

In addition, the throttle valve 13 for controlling the air-intake amount is provided downstream of the compressor 9. The intake plumbing 2 is branched downstream of the throttle valve 13 corresponding to each cylinder, and each of the branched intake plumbing 2 is branched into the two intake ports 2A and 2B. Moreover, in FIG. 1, a configuration corresponding to a single cylinder is shown.

In this structure, each cylinder is provided with two intake valves (not shown) and two exhaust valves (not shown). An inlet (not shown) to be opened and closed by the two intake valves is connected to each of the intake ports 2A and 2B. In addition, in the intake port 2B, a swirl control valve (hereinafter referred to as a "SCV") 14, which regulates an amount of intake air through the intake port 2B and produces a swirl in a combustion chamber, is provided. The throttle valve 13 and the SCV 14 are butterfly valves driven by an electric motor or a hydraulic actuator, and the openings of thereof are controlled by the ECU 20.

The exhaust gas recirculation passage 5 for recirculating the exhaust gas to the intake port 2B is disposed between the exhaust pipe 4 and the intake port 2B. The exhaust gas recirculation passage 5 is provided with the exhaust gas recirculation control valve (hereinafter referred to as an "EGR valve") 6 which controls a recirculation amount of the exhaust gas. The EGR valve 6 is an electromagnetic valve having a solenoid and an opening of which is controlled by the ECU 20. The lift sensor 7 for detecting the opening of the EGR valve 6 (valve lift amount) LACT is arranged in the EGR valve 6, and the detected signal thereof is supplied to the ECU 20. An exhaust gas recirculating mechanism is constituted with the exhaust gas recirculation passage 5 and the EGR valve 6. The EGR valve 6 is controlled by a duty ratio variable control signal so that the valve lift LACT coincides with a valve lift instruction value LCMD set in accordance with an operating condition of the engine.

The air mass sensor 21 for detecting an air-intake amount GA and the charge pressure sensor 22 for detecting a charge pressure PCH downstream of the compressor 9 are fixed in the intake plumbing 2, and the detected signals thereof are supplied to the ECU 20. The proportional air-fuel ratio sensor (hereinafter referred to as a "LAF sensor") 23 is provided downstream of the turbine 10 in the exhaust pipe 4, and the NOx purification device 11 is provided downstream of the LAF sensor 23. The LAF sensor 23 supplies a detected signal substantially proportional to the oxygen concentration of the exhaust gas.

The NOx purification device 11 is provided in the exhaust passage, and further is equipped with the catalyst temperature sensor 24 for detecting a catalyst temperature TCAT in the NOx purification device 11, the detected signal thereof being detected in the ECU 20. Moreover, a detailed configuration and operation of the NOx purification device 11 will be described later.

In addition, there are further provided the accelerator sensor 25 for detecting a manipulated amount of a accelerator pedal (not shown) (hereinafter referred to as an "accelerator pedal operation amount") of the vehicle driven by the engine 1 and the crank angle position sensor 26 for detecting a rotational angle of a crankshaft (not shown) of the engine 1, and detected signals these sensors are supplied to the ECU 20.

Here, the crank angle position sensor 26 includes a cylinder discrimination sensor that outputs a pulse at a predetermined crank angle position of a particular cylinder of the engine 1 (hereinafter referred to as a "CYL pulse"), a TDC sensor for outputting a TDC pulse at a crank angle position before a predetermined crank angle position with respect to top dead center at the start of an intake stroke of each engine cylinder (every 180 degrees of crank angle for a four-cylinder engine), and a CRK sensor that generates a CRK pulse at predetermined intervals of the crank angle shorter than the TDC pulse (e.g., at intervals of 30 degrees), the CYL pulse, the TDC pulse, and the CRK pulse being supplied to the ECU 20. These signal pulses are used to the control fuel injection control and the detection of the engine speed.

The ECU 20 is configured with an input circuit having a function of shaping waveforms of the input signals from various sensors, adjusting a voltage level to a predetermined level, and converting the analog signal values into digital signal values, a central processing unit (hereinafter referred to as a "CPU"), a memory circuit for storing various types of computing programs executed by the CPU and the computed results, and an output circuit for supplying the control signals to the fuel injectors 12, the EGR valve 6, the turbine 10, the throttle valve 13, the SCV 14 and the like.

[Configuration of NOx Purification Device]

The NOx purification device 11 according to the present embodiment is a monolithic catalyst including a carrier coated with two or more different catalyst layers, which are structured by a NOx purifying catalyst including at least a first catalyst layer containing a solid acid catalyst capable of adsorbing ammonia and a second catalyst layer containing a noble metal and a cerium oxide-based material. This NOx purifying catalyst will be described below.

[First Catalyst Layer]
Constituent

The first catalyst layer is preferably used as the uppermost layer that directly contacts the exhaust gas in the NOx purifying catalyst of the present invention. The first catalyst layer preferably contains substantially no platinum components, and more preferably contains no noble metal components.

The first catalyst layer includes the solid acid catalyst capable of adsorbing ammonia. A zeolite-based catalyst is preferably used as the solid acid catalyst. In addition, it is preferable for iron elements to be added to the zeolite-based catalyst, and more preferable for cerium elements to be added.

Although the reason for the purification performance of the exhaust gas, particularly NOx reduction performance, being improved by the addition of iron elements or cerium elements to the zeolite-based catalyst is not clear, it can be assumed that the iron element adsorbs NOx and the reductant, and the cerium element adsorbs NOx as well as suppresses catalyst poisoning by the reductant because of its storage and release ability of oxygen. It may be attributed to the combination of these elements which results in generating a synergistic effect that enhances the catalytic properties.

Although a type of zeolite-based catalyst is not limited, mordenite, ZSM-5-type synthetic zeolite, β zeolite or the like can be preferably exemplified, and among them, it may be preferable to use the β zeolite in view of its heat resistance.

Since the β zeolite used in the present invention generally has a relatively complex three dimensional porous structure composed of linear pores of relatively large pore size aligned in one direction with curved pores intersecting the linear pores, it has properties such as allowing diffusion of the cations in the ion exchange process and the diffusion of the hydrocarbons in the reduction process to occur easily. In comparison with mordenite and faujasite, which only have linear pores aligned in one direction, it can be said that β zeolite has a unique structure. In addition, such a structural feature of the β zeolite imparts the high heat resistance, and therefore the catalyst of the present invention can have superior heat resistance by using the β zeolite.

Adding iron element or cerium element to the β zeolite of the present invention can be performed by way of adding to a β zeolite as a solution of iron or cerium salts; however, a commercially available β zeolite having iron and cerium elements may also be used.

In addition, the β zeolite as prepared above can be in a state in which iron or cerium element are ion exchanged at the cation sites of β zeolite. The NOx purification performance can be improved in the present invention by way of ion exchanged β zeolite; however, a possible factor of the improvement is thought to be stabilization of a backbone structure of the β zeolite by ion exchange.

Content of Each Component

The content of the β zeolite in the first catalyst layer may be configured suitably and is not particularly limited, but is preferably in the range of 5 to 300 g/L, and more preferably in the range of 30 to 150 g/L per unit volume of the whole catalyst. When the content is 5 g/L or more, the exhaust gas purification capability of the present invention can be achieved, and when the content is 300 g/L or less, air permeability of the exhaust gas in honeycomb can be sufficiently maintained.

In addition, the amount of iron element added to the β zeolite is preferably in the range of 0.1 to 10 wt %, and more preferably in the range of 0.5 to 5 wt % of the zeolite in oxide equivalent. When the added amount is more than 10%, a sufficient number of solid acidic points cannot be assured, which may lead to deterioration of the catalytic activity as well as the heat resistance, and when the amount is 0.1 wt % or more, sufficient NOx purification performance can be achieved.

In a case where the cerium element is added, the amount of cerium element added to the β zeolite is preferably in the range of 0.05 to 5 wt %, and more preferably in the range of 0.1 to 3 wt % based on the zeolite in oxide equivalent. When the amount is 0.05 wt % or more, the catalyst poisoning due to the reductant in the exhaust gas can be suppressed; however, when the amount is more than 5 wt %, a sufficient number of solid acidic points cannot be assured, which may lead to deterioration of the catalytic activity as well as the heat resistance.

[Second Catalyst Layer]
Constituent

Noble metals such as platinum and cerium oxide-based materials are added to the second catalyst layer. This is because that the synergistic effect of the cerium oxide-based material and the noble metal such as platinum enhances NOx purification performance. Although the reason for NOx purification performance being improved is not clear, it may be attributed to the suppression of the poisoning of platinum by reductant and the adsorption of NOx.

Cerium oxide or cerium oxide-zirconium oxide composite oxide, or oxides thereof with auxiliary materials can be used as the cerium oxide-based material for use in the present invention. Moreover, when cerium oxide-zirconium oxide composite oxide is used, it preferably contains 10 wt % or more, more preferably 30 wt % or more, and most preferably 50 wt % or more of cerium in oxide equivalent.

To the cerium oxide-based material used in the present invention, rare earth elements such as praseodymium, neodymium, lanthanum, samarium, and cerium may be added as additives. Such additives are preferably incorporated into the crystal structure of the cerium oxide-based material and stably exist in the form of metal, oxide, etc. As a result of the existence, heat resistance and durability of the cerium oxide-based material can be improved.

Thus, as the cerium oxide-based material, cerium oxide and/or composite oxide of cerium and rare earth elements are preferred, for example, a cerium oxide-based material including cerium oxide and the composite oxide such as $CeO_2$+Ce—Pr—La-Ox.

A commercially available cerium oxide-based material may be used, as well as the cerium oxide-based material can be prepared by a publicly known method. For example, according to the method disclosed in Japanese Unexamined Patent Application Publication No. H06-316416, the cerium oxide-based material can be prepared by mixing nitrate salts of praseodymium, neodymium, lanthanum, samarium, and the like with cerium sol, and optionally with zirconium sol, followed by drying and calcination.

Heat resistant inorganic oxides other than cerium oxide such as zirconium oxide-based material, alumina-based material, and silica-based material may be further added to the second catalyst layer. The zirconium oxide-based material is preferably zirconium oxide and/or a composite oxide of zirconium and rare earth elements, and more preferably a composite oxide such as Zr—Nd-Ox.

The second catalyst layer contains a noble metal and a cerium oxide-based material, and is preferably a noble metal carried on a cerium oxide-based material and a noble metal carried on a zirconium oxide-based material as the catalytic active species. As the noble metal, platinum is required as an essential component, but gold, palladium, and rhodium may be added as necessary; however, platinum is preferred because of its high activity.

Although the reason for the purification of NOx in the exhaust gas being facilitated by the use of platinum is not clear, it may be attributed to NO, the major component of the exhaust gas, being oxidized to $NO_2$ by platinum, and the adsorption of $NO_2$ by the cerium component used in the catalyst of present invention facilitating the reaction with the reductant.

The catalytically active noble metal is used by being carried by the cerium oxide-based material or a heat-resistant inorganic oxide other than the cerium oxide-based material (hereinafter simply referred to as "heat-resistant inorganic oxide") is used. The noble metal can be carried entirely by the cerium oxide-based material and heat-resistant inorganic oxide that are the constituents of the catalyst layer, and can be carried on the particular inorganic oxide. The particular inorganic oxide preferably includes cerium oxide-based materials that have high specific surface area and heat resistance, and such cerium oxide-based materials preferably include a small amount of rare earth elements such as lanthanum (La) and praseodymium (Pr) in the crystal structure so that the heat resistance is improved. In addition, γ-alumina is preferred as another heat-resistance inorganic oxide.

Content of Each Component

The catalytically active noble metal content in the second catalyst layer is preferably in the range of 0.1 to 20 g/L, and more preferably in the range of 1 to 10 g/L per unit volume of the whole catalyst. When the content is 0.1 g/L or more, the catalysis can exhibit the purification capability, and when the content is more than 20 g/L, no further improvement in performance is achieved.

When a noble metal other than platinum is used in combination with platinum as the catalytic active species, the amount of platinum is preferably 50% or more, more preferably 70% or more, and most preferably 90% or more of the total amount of noble metals.

The content of cerium oxide-based material and heat-resistant inorganic oxide used in the second catalyst layer is preferably in the range of 10 to 300 g/L, and more preferably in the range of 30 to 150 g/L per unit volume of the whole catalyst of the present invention. When the content is 10 g/L or more, carrying of noble metals capable of realizing the exhaust gas purification capability of the present invention can be achieved, and when the content is 300 g/L or less, air permeability of the exhaust gas in the honeycomb can be sufficiently maintained.

The content of cerium oxide-based material is preferably in the range of 1 to 300 g/L, and more preferably in the range of 10 to 200 g/L per unit volume of the whole catalyst of the present invention. When the content is 1 g/L or more, the exhaust gas purification performance of the present invention can be achieved, and when the content is 300 g/L or less, air permeability of the exhaust gas in the honeycomb can be sufficiently maintained. Moreover, when cerium oxide and a composite oxide are used together, the ratio of cerium oxide to the composite oxides is preferably in the ratio of 100:0 to 50:50. For zirconium oxide-based material, the content thereof may be arbitrarily set and is not particularly limited, but is preferably in the range of 5 to 50 g/L, and more preferably in the range of 10 to 30 g/L. More than two kinds of cerium oxide-based materials may be used in combination.

Other Components

The first and/or second catalyst layers may include other components, for example, a heat resistance improving component or a reinforcement component such as alumina and silica, and an adhesion enhancer (binder), etc.

As the binder, a zirconia-based compound, alumina-based compound, silica-based compound and the like may be preferably exemplified. In addition, as the heat resistance improving component or the reinforcement component, alkali, alkali earth, or other metals such as potassium, rubidium, cesium, magnesium, calcium, strontium, barium, antimony, hafnium, tantalum, rhenium, bismuth, gadolinium, holmium, thulium, ytterbium, germanium, selenium, cadmium, indium, scandium, titanium, niobium, chromium, and silver may be preferably exemplified.

[Laminating Configuration of First Catalyst Layer and Second Catalyst Layer]

In the present invention, the NOx purifying catalyst forming the NOx purification device 11 is characterized in that the configuration of the first catalyst layer and the second catalyst layer are specified. In other words, it is preferable for the second catalyst layer and the first catalyst layer to be stacked in that order on a carrier so that the first catalyst layer becomes the uppermost layer. In addition, the second catalyst layer, which is a lower layer, is preferably formed so that the content of the noble metal decreases gradually or stepwise from the first catalyst layer to the carrier. This implies that the second catalyst layer is not necessarily a monolayer, but may include multiple layers, in which the content of the noble metal in each layer decreases gradually or stepwise.

[Arrangement of NOx Purification Device]

The above-described NOx purification device 11 is connected to the exhaust pipe 4 from the engine 1 as shown in FIG. 1, and may further include temperature adjusting means, not-shown, capable of controlling the temperature of the NOx purification device 11 in the range of 400° C. or less, and preferably 300° C. or less.

In addition, the exhaust pipe 4 from the engine 1 may preferably have a structure in which, a three-way catalyst (TWC), not-shown, a diesel particulate filter (DPF), not-shown, and the NOx purification device 11 are arranged in this order in the exhaust, direction. Furthermore, in this case, the NOx purification device 11 may preferably be separated from the engine 1 and arranged at a position that does not substantially receive a heat effect thereof. The NOx purification device 11 is characterized by having a sufficient NOx purification capability under low-temperature operating conditions. Therefore, even if the NOx purification device 11 is separated from the engine 1 and arranged at a position not substantially receiving a heat effect thereof, sufficient NOx removal efficiency can be achieved. More specifically, the NOx purification device 11 may be arranged, for example, under a floor of a vehicle, the NOx purification device 11 of the present invention having the characteristics of a high flexibility of arrangement.

[Function of NOx Reduction System]

Next, a function of the NOx reduction system of the present invention is explained. An example of the NOx purifying catalyst forming the NOx purification device 11 is made of configuration shown in the following Table 1, and is a catalyst made from a two-layer structure of an upper layer and a lower layer as used in the Examples described later. In this example, the upper layer and the lower layer correspond to the first catalyst layer and the second catalyst layer of the present invention, respectively.

TABLE 1

|  | Composition |
| --- | --- |
| Upper Layer | Fe and Ce ion-exchanged β zeolite<br>Al$_2$O$_3$<br>Binder |
| Lower Layer | Pt<br>CeO$_2$<br>Ce—Pr—La—Ox<br>Zr—Nd—Ox<br>Al$_2$O$_3$ |

Function Under Low-temperature Operating Conditions

Lean Condition 1

First, under a condition in which the air-fuel ratio is made lean (normal operating condition of a diesel engine), NOx in the exhaust gas passes through the upper layer (first catalyst layer), then reaches the lower layer (second catalyst layer), NOx is oxidized by the noble metal (Pt herein) (for example, NO→NO$_2$), while this NO$_2$ is adsorbed momentarily on the lower layer (both are the second catalyst layer) and temporarily stored thereon. At this point, Pt acts as a NO oxidation catalyst, and CeO$_2$ and Ce—Pr—La-Ox act as NOx adsorbents.

Rich Condition

Next, under a condition in which the air-fuel ratio of the exhaust gas is made rich, NOx adsorbed on the lower layer under the abovementioned lean condition 1 is converted to ammonia (Formula 2) by the reaction with the hydrogen generated from the water-gas-shift reaction (Formula 1), and the ammonia thus formed moves to the upper layer, and is adsorbed in the solid acid to be re-stored. At this time, Pt/Zr—Nd-Ox and Pt/CeO$_2$ act as water gas shift catalysts, Pt acts as an NH$_3$ generation catalyst, and Fe and Ce ion-exchanged β zeolite act as NH$_3$ adsorbents.

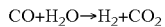
$$CO+H_2O \rightarrow H_2+CO_2 \quad \text{(Formula 1)}$$

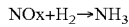
$$NOx+H_2 \rightarrow NH_3 \quad \text{(Formula 2)}$$

Lean Condition 2

Under a state in which the air-fuel ratio of the exhaust gas is made lean, the ammonia re-stored on the upper layer and the NOx contained in the exhaust gas react, and are converted to nitrogen by the ammonia selective catalytic reduction (NH$_3$—SCR) (Formula 3), and the nitrogen formed can be released from the surface of the upper layer. At this time, Fe and Ce ion-exchanged β zeolite act as an NH$_3$—SCR catalyst.

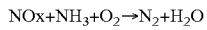
$$NOx+NH_3+O_2 \rightarrow N_2+H_2O \quad \text{(Formula 3)}$$

As describe above, according to the catalyst having the aforementioned configuration, the NOx reduction performance can be improved even under low-temperature operating conditions because a series of the cycle of temporary storage of NOx in the lower layer, the conversion to ammonia, the re-storage of ammonia in the upper layer, the reduction to nitrogen, and the release thereof at the upper layer occurs efficiently. Moreover, the low-temperature region in the present invention is 400° C. or lower, and preferably 300° C. or lower.

It should be noted that, in the present invention, for example, the catalyst may be triple layered including an upper, middle, and lower layer by making the lower layer a double layered structure. In this case, the Pt content in the middle and the lower layers may be different, for example, the middle layer may have higher Pt content than the lower layer. Furthermore, the middle and lower layers may be configured so that only the middle layer contains Pt, and the lower layer contains no Pt.

[Control Method of NOx Reduction System]

Next, air-fuel ratio switch control processing for performing a switch control between a lean burn operation and a reduction operation will be explained by using FIG. 2. Moreover, this processing is executed by the CPU of the ECU 20 every fixed time (e.g., 100 milliseconds).

First, it is determined whether or not an enrichment flag FRICH is "1" (Step S11). The enrichment flag FRICH is set to "1" when executing reduction (refer to Step S28), and set to "0" when the reduction is completed and lean burn operation is switched to (refer to Step S20). When FRICH=1, the fuel injection amount is increased, and also the air-intake amount is reduced by adjusting the opening of the throttle valve 13 by a process not-shown, thereby enriching the air-fuel ratio to perform the reduction.

Figure 5A:
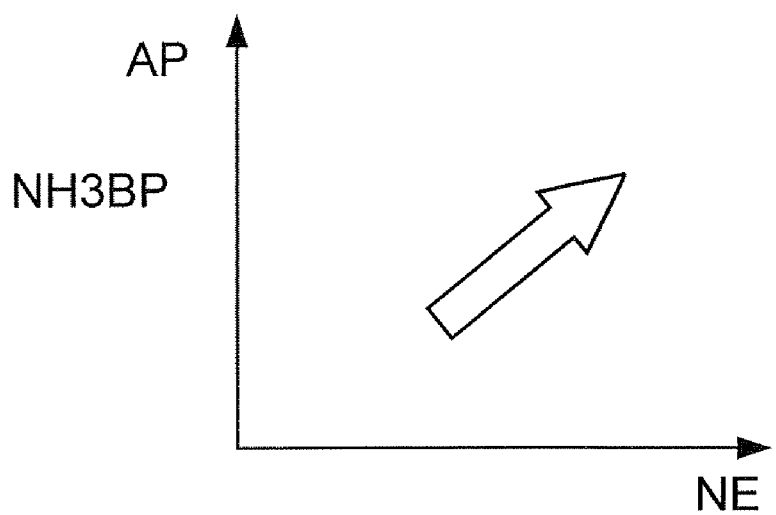
FIGS. 5A and 5B are views showing maps in which a basic ammonia generation amount NH3BP and a basic NOx reduction amount NOxBM used in the process of FIG. 2 are set, respectively.
Figure 5B:
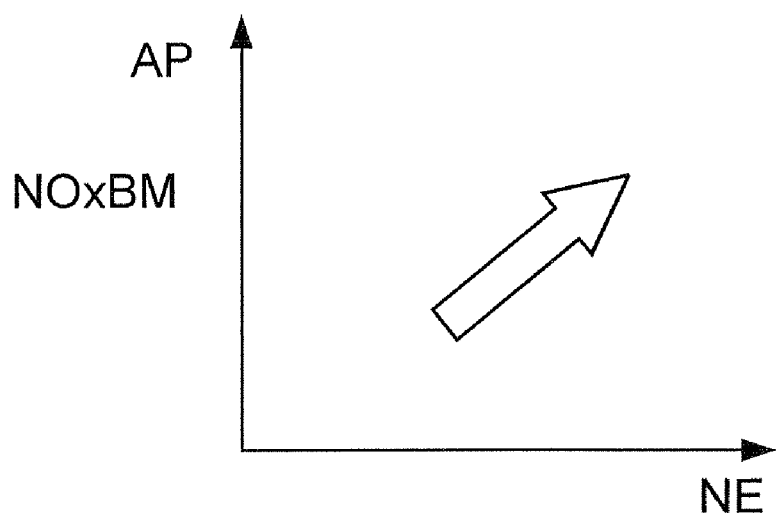

Next, an NH3BP map shown in FIG. 5A and a NOxBM map shown in FIG. 5B are retrieved according to the engine revolution speed NE and the accelerator pedal operation amount AP, and a basic ammonia generation amount NH3BP and basic NOx subtraction amount NOxBM are calculated (Step S13). The basic ammonia generation amount NH3BP is the amount of ammonia adsorbed by zeolite per unit time period at a reference catalyst temperature, and the basic NOx subtraction amount NOxBM is the amount of NOx reduced per unit time period at a standard catalyst temperature. Moreover, the NH3BP map is set so that the basic ammonia generation amount NH3BP may increase as the engine revolution speed NE increases or as the accelerator pedal operation amount AP increases. The NOxBM map is also set so that the basic NOx subtraction amount NOxBM may increase as the engine revolution speed NE increases or as the accelerator pedal operation amount AP increases.

Figure 6A:
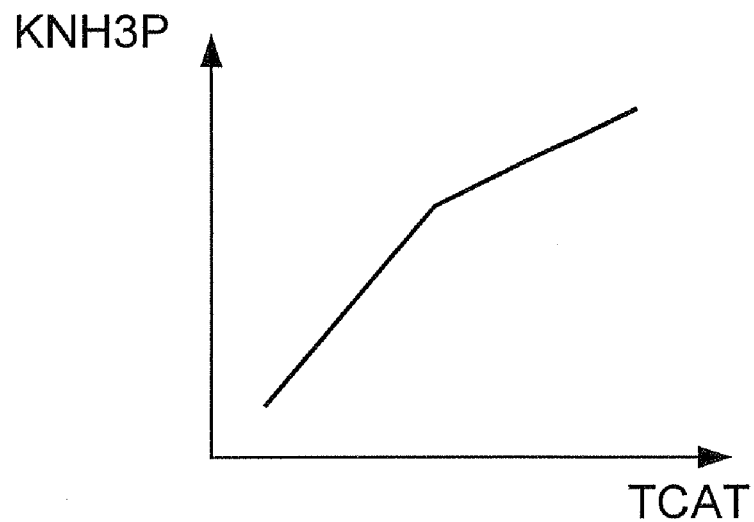
FIGS. 6A and 6B are views showing maps in which an ammonia generation temperature correction coefficient KNH3P and a NOx reduction temperature correction coefficient KNOxM used in the process of FIG. 2 are set, respectively.
Figure 6B:
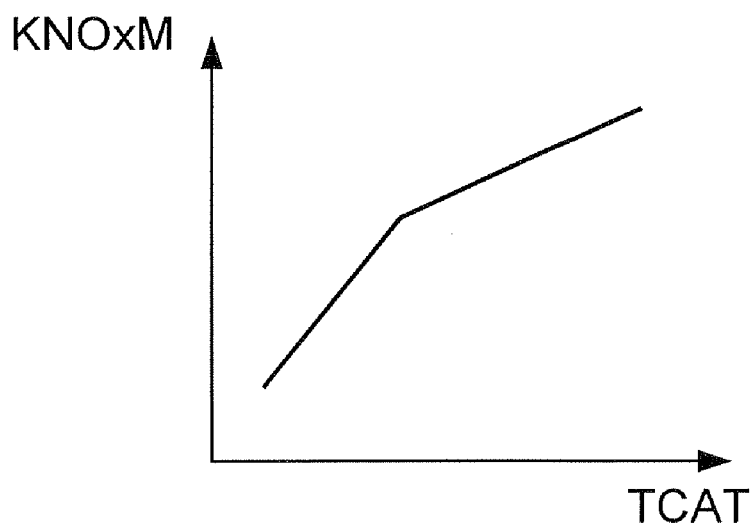

Furthermore, a KNH3P table shown in FIG. 6A and an KNOxM table shown in FIG. 6B are retrieved according to the catalyst temperature TCAT, and an ammonia generation temperature correction coefficient KNH3P and a NOx subtraction temperature correction coefficient KNOxM are calculated (Step S14). Moreover, the KNH3P table is set so that the ammonia generation temperature correction coefficient KNH3P may increase as the catalyst temperature TCAT increases. The KNOxM table is also set so as to increase the catalyst temperature TCAT the more the NOx subtraction temperature correction coefficient KNOxM increases.

Next, an ammonia generation amount NH3P is calculated by multiplying the basic ammonia generation amount NH3BP by the ammonia generation temperature correction coefficient KNH3P using the following equation (1) shown below, along with the a NOx subtraction amount NOxM being calculated by multiplying the basic NOx subtraction amount NOxBM by the NOx subtraction temperature correction coefficient KNOxM using the following equation (2) (Step S15).

$$NH3P=KNH3P \times NH3BP \quad (1)$$

$$NOxM=KNOxM \times NOxBM \quad (2)$$

The basic ammonia generation amount NH3BP and the basic NOx subtraction amount NOxBM are corrected, respectively, by the ammonia generation temperature correction coefficient KNH3P and the NOx subtraction temperature correction coefficient KNOxM since the ammonia generation amount and the NOx reduction amount per unit time period change depending on the catalyst temperature TCAT. Therefore, by the correction described above, the ammonia generation amount NH3P and the NOx subtraction amount NOxM can be properly calculated. Moreover, when executing the reduction, since the ammonia generation amount per unit time period increases as the air-fuel ratio decreases (i.e. as the concentration of reducing components in the exhaust gases increases), the ammonia generation amount NH3P may be calculated using another correction coefficient KNH3AF which is set to increase as the air-fuel ratio decreases. That is, the ammonia generation amount NH3P may be calculated by multiplying the basic ammonia generation amount NH3BP by the correction coefficient KNH3AF in addition to the ammonia generation temperature correction coefficient KNH3P.

Furthermore, a residual NOx amount ΣNOx is calculated using the following equation (3) (Step S16). The residual NOx amount ΣNOx indicates an amount of NOx adsorbed by the ceria in the NOx purification device 11. If the calculated residual NOx amount ΣNOx is less than "0", limit processing is executed to set the residual NOx amount ΣNOx to "0".

$$\Sigma NOx=\Sigma NOx-NOxM \quad (3)$$

Here, ΣNOx on the right side is a preceding calculated value.

Next, it is determined whether the residual NOx amount ΣNOx is "0" (Step S17). If the residual NOx amount ΣNOx is "0" ("YES" in Step S17), to complete of reduction, the process immediately advances to Step S20, the enrichment flag FRICH is set to "0," and this processing ends. On the other hand, if the residual NOx amount ΣNOx is not equal to "0" ("NO" in Step S17), a residual ammonia amount Σ NH3 is calculated by following equation (4) (Step S18). The residual ammonia amount ΣNH3 indicates a residual amount of ammonia currently adsorbed by the zeolite in the NOx purification device 11.

$$\Sigma NH3=\Sigma NH3+NH3P \quad (4)$$

Here, ΣNH3 on the right side is a preceding calculated value.

Next, it is determined whether the residual ammonia amount ΣNH3 is greater than an upper ammonia threshold value NH3THH (Step S19). The upper ammonia threshold value NH3THH is set to a predetermined value, which is in the vicinity of the maximum amount of ammonia which can be adsorbed by the zeolite in the NOx purification device 11. If the residual ammonia amount ΣNH3 is greater than the upper ammonia threshold value NH3THH ("YES" in Step S19), to complete the reduction, the process advances to Step S20, the enrichment flag FRICH is set to "0," and this processing ends. If the residual ammonia amount ΣNH3 is less than or equal to the upper ammonia threshold value NH3THH ("NO" in Step 19), this processing immediately ends.

Figure 7A:
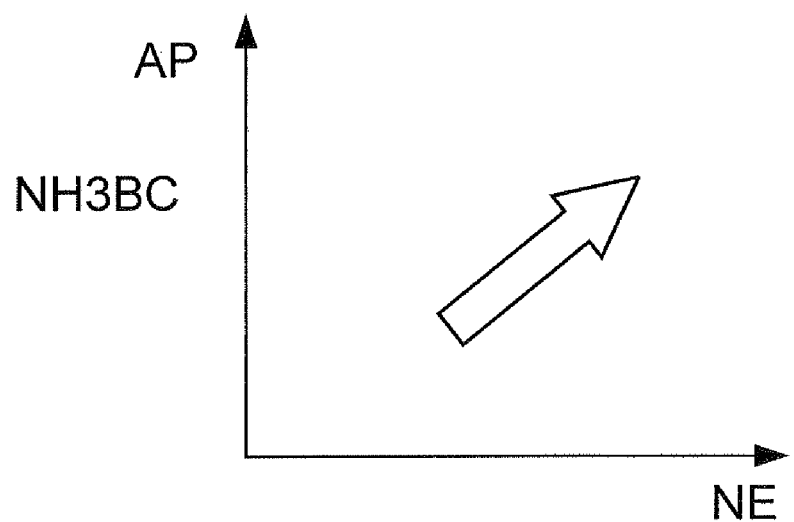
FIGS. 7A and 7B are views showing maps in which a basic ammonia consumption amount NH3BC and a basic NOx addition amount NOxBA used in the process of FIG. 2 are set, respectively.
Figure 7B:
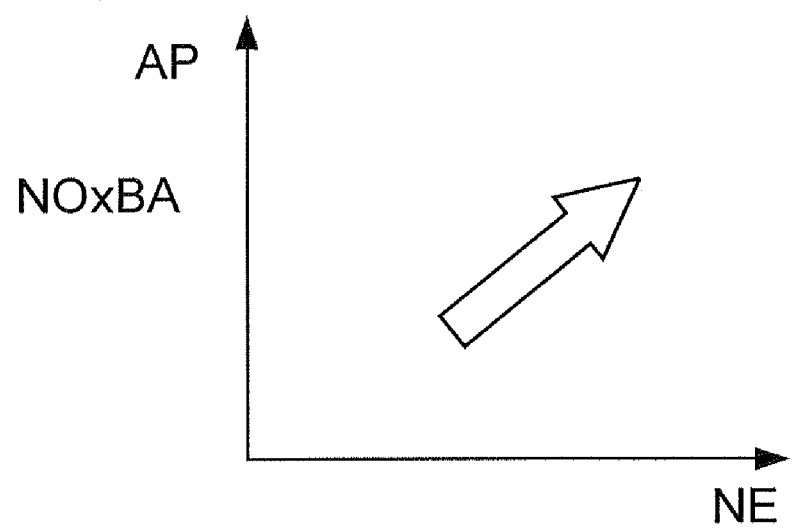

On the other hand, if FRICH is equal to "0" in Step S11, the process advances to Step S22, in which a NH3BC map shown in FIG. 7A and a NOxBA map shown in FIG. 7B are retrieved according to the engine revolution speed NE and the accelerator pedal operation amount AP to calculate a basic ammonia consumption amount NH3BC and a basic NOx addition amount NOxBA. The basic ammonia consumption amount NH3BC indicates an amount of ammonia consumed per unit time period at the reference catalyst temperature (amount of ammonia used for the reduction of NOx), and the basic NOx addition amount NOxBA indicates an amount of NOx adsorbed by the ceria per unit time period at the reference catalyst temperature. Here, the NH3BC map is set so that the basic ammonia consumption amount NH3BC may increase as the engine revolution speed NE increases or as the accelerator pedal operation amount AP increases. The NOxBA map is set so that the basic NOx addition amount NOxBA may increase as the engine revolution speed NE increases or as the accelerator pedal operation amount AP increases.

Figure 8A:
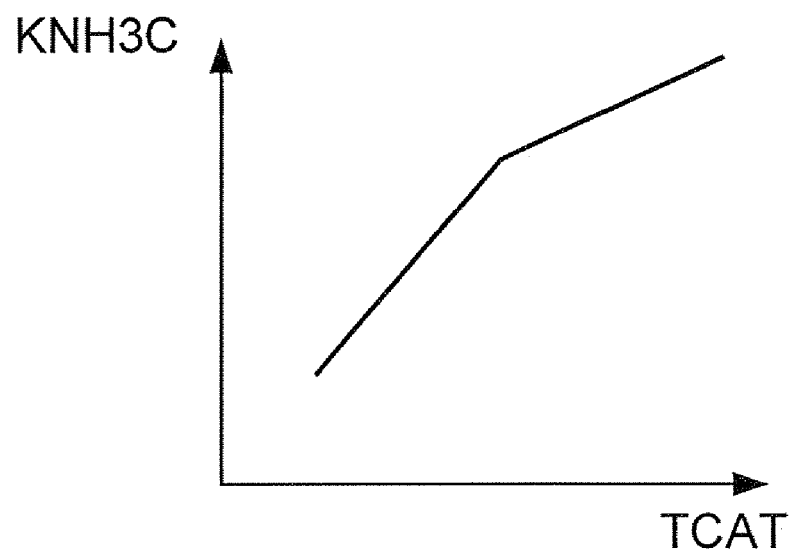
FIGS. 8A and 8B are views showing maps in which an ammonia consumption temperature correction coefficient KNH3C and a NOx addition temperature correction coefficient KNOxA used in the process of FIG. 2 are set, respectively.
Figure 8B:
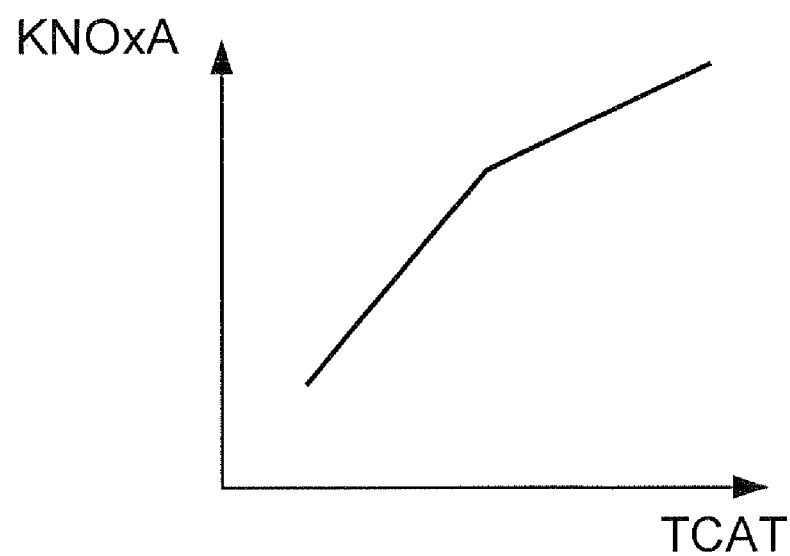

Next, a KNH3C table shown in FIG. 8A and a KNOxA table shown in FIG. 8B are retrieved according to the catalyst temperature TCAT, to calculate an ammonia consumption temperature correction coefficient KNH3C and a NOx addition temperature correction coefficient KNOxA (Step S23). Here, the KNH3C table is set so that the ammonia consumption temperature correction coefficient KNH3C may increase as the catalyst temperature TCAT rises. The KNOxM table is also set so that the NOx addition temperature correction coefficient KNOxA may increase as the catalyst temperature TCAT rises.

An ammonia consumption amount NH3C is calculated by multiplying the basic ammonia consumption amount NH3BC by the ammonia consumption temperature correction coefficient KNH3C using the following equation (5), along with a NOx addition amount NOxA being calculated by multiplying the basic NOx addition amount NOxBA by the NOx addition temperature correction coefficient KNOxA using the following equation (6) (Step S24).

$$NH3C=KNH3C \times NH3BC \quad (5)$$

$$NOxA=KNOxA \times NOxBA \quad (6)$$

The basic ammonia consumption amount NH3BC and the basic NOx addition amount NOxBA are corrected, respectively, by the ammonia consumption temperature correction coefficient KNH3C and the NOx addition temperature correction coefficient KNOxA because the consumption amount of ammonia and the adsorption amount of NOx per unit time period change depend on the catalyst temperature TCAT. Therefore, by the correction described above, the ammonia consumption amount NH3C and the NOx addition amount NOxA can be properly calculated. Moreover, when executing lean burn operation, since the generation amount of NOx per unit time period increases as the exhaust gas recirculation amount decreases, the NOx addition amount NOxA may be calculated using another correction coefficient KNOxEGR which is set to increase as the exhaust gas recirculation amount decreases, and the NOx addition amount NOxA may be calculated by multiplying the basic NOx addition amount NOxBA by the correction coefficient KNOxEGR in addition to the NOx addition temperature correction coefficient KNOxA.

The residual NOx amount ΣNOx is calculated by the following equation (7) (Step S25).

$$\Sigma NOx = \Sigma NOx + NOxA \quad (7)$$

Here, ΣNOx on the right side is a preceding calculated value. The residual ammonia amount ΣNH3 is calculated by following equation (8) (Step S26).

$$\Sigma NH3 = \Sigma NH3 - NH3C \quad (8)$$

ΣNH3 on the right side is a preceding calculated value.

Next, it is determined whether the residual ammonia amount ΣNH3 is less than a lower ammonia threshold value NH3THL (Step S27). The lower ammonia threshold value NH3THL is set to a predetermined value in the vicinity of "0". If the residual ammonia amount ΣNH3 is less than the lower ammonia threshold value NH3THL ("YES" in Step S27), to execute reduction, the processing advances to Step S28, the enrichment flag FRICH is set to "1," and this processing ends. If the residual ammonia amount ΣNH3 is greater than or equal to the lower ammonia threshold value NH3THL ("NO" in Step S27), this processing immediately ends.

Figure 2:
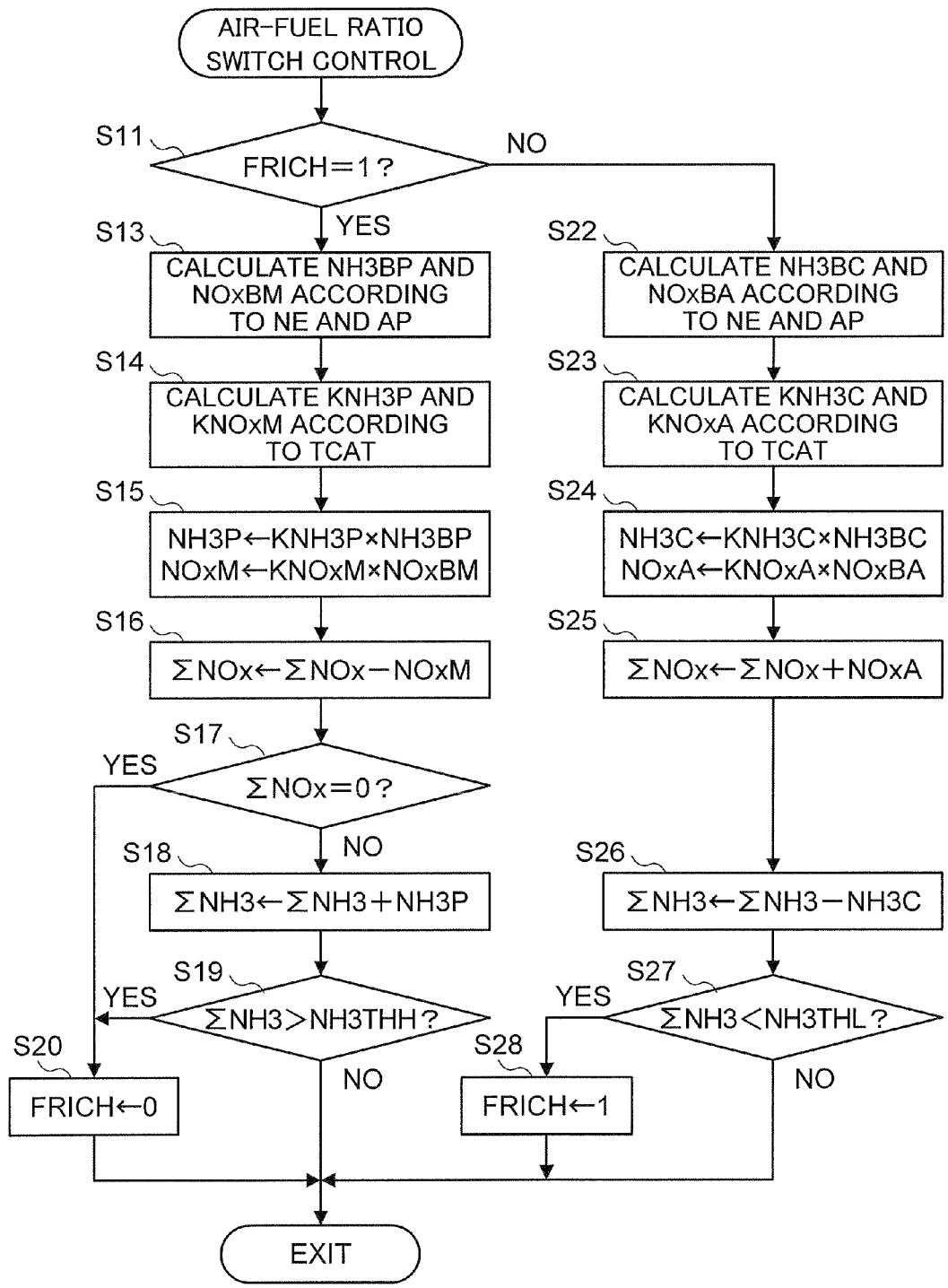
FIG. 2 is a flowchart of an air-fuel ratio switch control process for performing a switch control between lean burn operation and reducing operation.

According to the processing of FIG. 2, when the residual ammonia amount ΣNH3 becomes less than the lower ammonia threshold value NH3THL during the lean burn operation, the enrichment flag FRICH is set to "1", and reduction is started. On the other hand, during reduction execution, when the residual ammonia amount ΣNH3 exceeds the upper ammonia threshold value NH3THH, the enrichment flag FRICH is set to "0" and enrichment operation (reduction operation) is switched to the lean burn operation. That is, the concentration of reducing components in the exhaust gas flowing into the NOx purification device 11 is switched from the higher side to the lower side or from the lower side to the higher side with respect to the oxygen concentration according to the residual ammonia amount ΣNH3. Since NOx purification performance of the NOx purification device 11 during the lean burn operation changes depending on the residual ammonia amount ΣNH3, by switching from the lean burn operation to the reduction operation according to the residual ammonia amount ΣNH3, the reduction operation can be started at a proper timing, thereby being capable of maintaining good NOx purification performance. In addition, a situation can be avoided in which the ammonia generation amount exceeds the ammonia retaining capacity of the NOx purification device 11 by switching from the reduction operation to the lean burn operation according to the residual ammonia amount ΣNH3.

Figure 3:
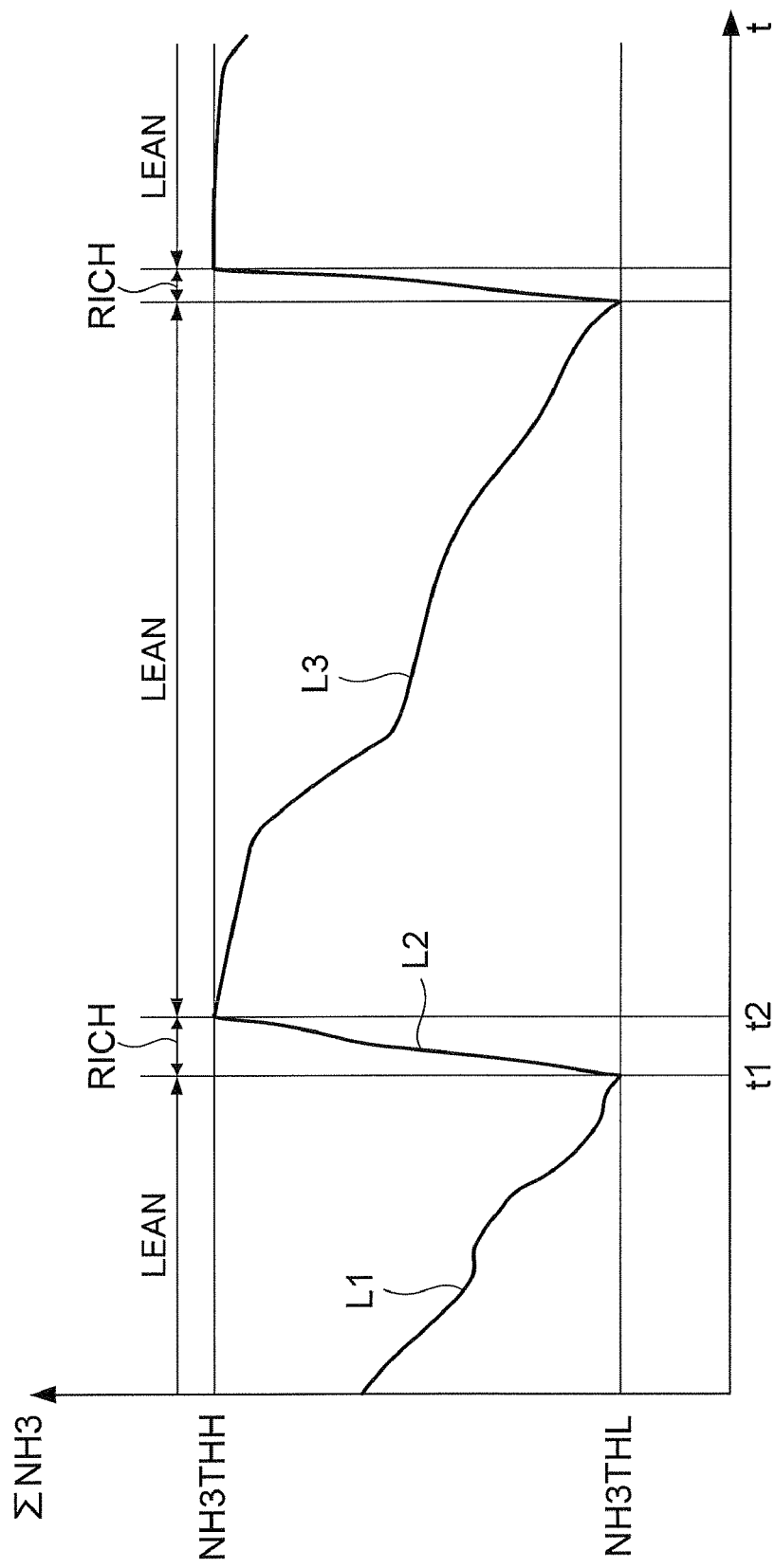
FIG. 3 is a timing chart for explaining processing of FIG. 2.

FIG. 3 is a time chart for illustrating the processing of FIG. 2, and the lines L1 to L3 in FIG. 3 show changes in the residual ammonia amount ΣNH3. In the period before time t1, the enrichment flag FRICH is set to "0", and lean burn operation is performed. That is, the concentration of reducing components in the exhaust gases flowing into the NOx purification device 11 is set to a value which is lower than the oxygen concentration, and due to the ammonia adsorbed by the zeolite reacting with NOx and oxygen in the exhaust gases, the residual ammonia amount ΣNH3 decreases as shown by the line L1. At time t1, if the residual ammonia amount ΣNH3 becomes less than the lower ammonia threshold value NH3THL, the enrichment flag FRICH is set to "1" (Step S28), and the concentration of reducing components in the exhaust gases flowing into the NOx purification device 11 is switched from the lower side to the higher side with respect to the oxygen concentration. That is, reduction is executed.

When the concentration of reducing components in the exhaust gases flowing into the NOx purification device 11 is set to a value which is higher than the oxygen concentration, due to ammonia being generated and adsorbed by the zeolite, the residual ammonia amount ΣNH3 increases as shown by the line L2. At time t2, if the residual ammonia amount ΣNH3 exceeds the upper ammonia threshold value NH3THH, the enrichment flag FRICH is set to "0" (Step S20), and the concentration of reducing components in the exhaust gases flowing into the NOx purification device 11 is switched from the higher side to the lower side with respect to the oxygen concentration. That is, reduction is terminated and lean burn operation is shifted to. Thereafter, the residual ammonia amount ΣNH3 decreases again as shown by the line L3.

[Control Method in Modified Example]

Figure 4:
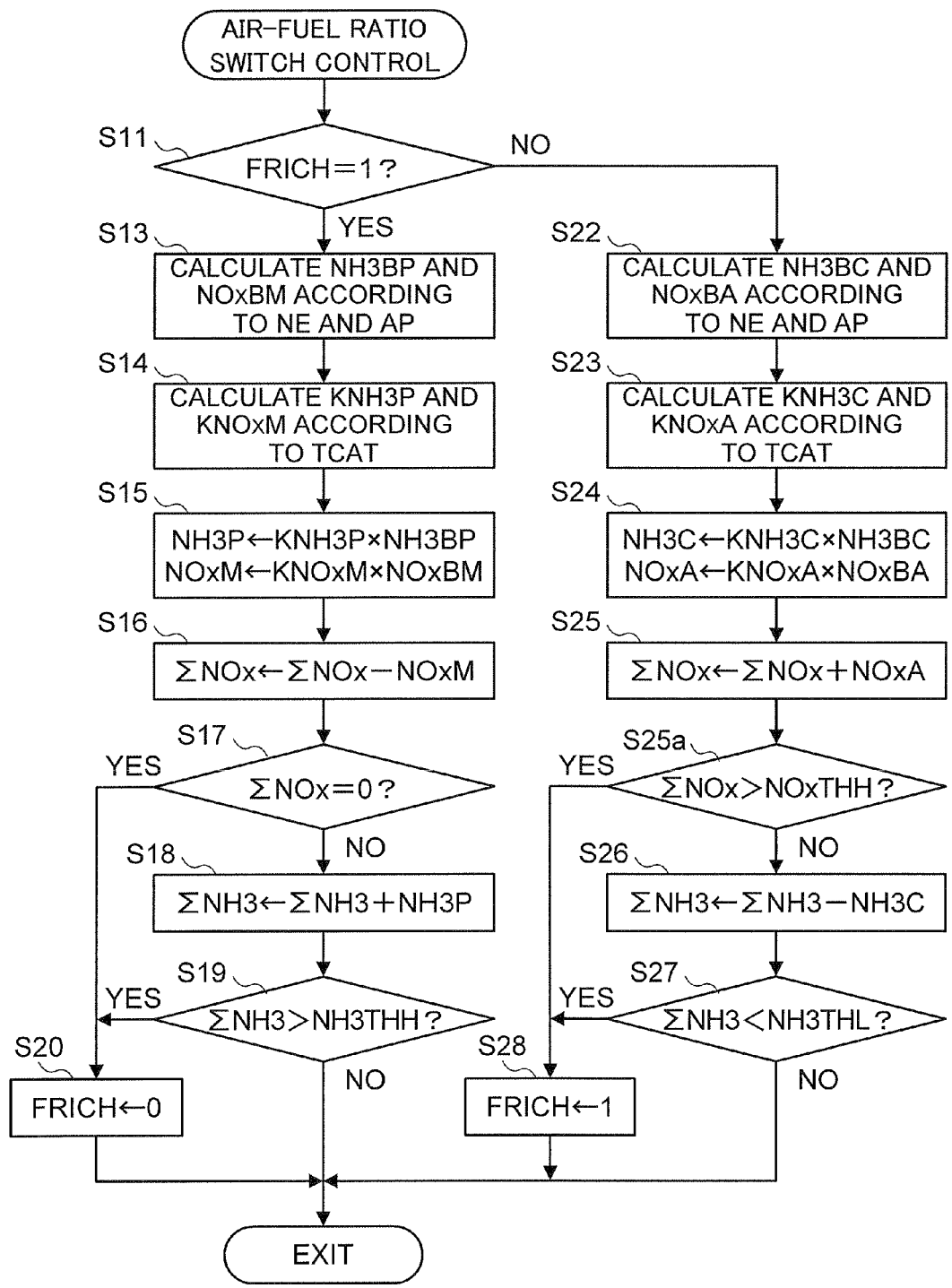
FIG. 4 is a flowchart showing a modified example of the processing of FIG. 2.

In the above-described embodiment, switching the concentration of reducing components in the exhaust gas flowing into the NOx purification device 11 from the lower side to the higher side with respect to the oxygen concentration is performed according to only the residual ammonia amount ΣNH3; however, as shown in FIG. 4, switching the concentration of reducing components in the exhaust gases from the lower side to the higher side may be performed according to the residual NOx amount ΣNOx in addition to the residual ammonia amount ΣNH3.

FIG. 4 adds Step S25a to the processing of FIG. 2. In Step S25a, it is determined whether the residual NOx amount ΣNOx is greater than an upper limit NOx threshold value NOxTHH. The upper limit NOx threshold value NOxTHH is set to a predetermined value in the vicinity of the maximum amount of NOx that can be adsorbed by the ceria (and platinum) in the NOx purification device 11. If the residual NOx amount ΣNOx is greater than the upper limit NOx threshold value NOxTHH ("YES" in Step S25a), to execute reduction, the processing proceeds to Step S28, the enrichment flag FRICH is set to "1", and this processing ends. If the residual NOx amount ΣNOx is less than or equal to the upper limit NOx threshold value NOxTHH ("NO" in Step S25a), the processing proceeds to Step S26.

In addition, in the above-described embodiment, switching the concentration of reducing components in the exhaust gases flowing into the NOx purification device 11 from the higher side to the lower side, as well as switching from the lower side to the higher side with respect to the oxygen concentration, is performed according to the residual ammonia amount ΣNH3; however, only one switching of the concentration of reducing components in the exhaust gases from the higher side to the lower side with respect to the oxygen concentration and switching from the lower side to the higher side may be performed according to the residual ammonia amount ΣNH3. In such a case, the switching which is not performed according to the residual ammonia amount ΣNH3 may be performed according to the residual NOx amount ΣNOx (refer to Steps S17 and S25a). Furthermore, in the above-described embodiment, switching the concentration of reducing components in the exhaust gases from the higher side to the lower side with respect to the oxygen concentration is performed according to the residual NOx amount ΣNOx in addition to the residual ammonia amount ΣNH3; however, it may be performed according to only the residual ammonia amount ΣNH3.

In the above-described embodiment, the basic ammonia generation amount NH3BP, the basic NOx subtraction amount NOxBM, the basic ammonia consumption amount NH3BC, and the basic NOx addition amount NOxBA are calculated according to the engine revolution speed NE and the accelerator pedal operation amount AP; however, these parameters may be calculated according to the air-fuel ratio detected by the LAF sensor 23 and the intake air flow rate GA detected by the air mass sensor 21. In addition, in the above-described embodiment, the basic ammonia generation amount NH3BP is corrected by the ammonia generation temperature correction coefficient KNH3P; however, the basic ammonia generation amount NH3BP may be further corrected by the residual NOx amount ΣNOx.

In the above-described embodiment, primary fuel injection of one time is performed corresponding to one cylinder in one combustion cycle, and reduction is performed by increasing the fuel injection amount TOUT of the main injection; however, reduction may be performed by executing at least one post injection (supplemental fuel injection executed after the primary injection) in addition to the primary injection. In addition, the mechanism for supplying reducing components, such as fuel, hydrogen, or ammonia, directly to the exhaust pipe 4, may be provided as a reducing component supply means, and this reducing component supply means may perform reduction.

In addition, in the above-described embodiment, the present invention is applied to a diesel internal combustion engine; however, the present invention can also be applied to a gasoline internal combustion engine. Furthermore, the present invention can also be applied to the air-fuel ratio control for a watercraft propulsion engine, such as an outboard engine having a vertically extending crankshaft.

EXAMPLES

Hereinafter, the present invention will be explained in more detail with reference to Examples.

Example 1

[Preparation of Catalyst for NOx Reduction System]

As a NOx purifying catalyst included in the NOx purification device 11, a double-layered catalyst, as shown in Table 1, was prepared by the slurry method known in the art. In other words, a slurry was prepared for each catalyst layer by mixing starting materials with aqueous media by a ball mill, the carrier as shown below was coated with the slurry by wash coating so that the proportion of each components becomes as shown in Table 2, followed by drying and calcination under the conditions shown below, thereby preparing the catalyst for the NOx purification device 11. Moreover, in the preparation of the slurry for the lower layer of the present Example, an aqueous solution of platinum chloride was mixed with the each material.

Support
  Size: 150.7 mm in diameter×114.3 mm (2038 cc)
  Wall thickness: 4.3 mil
  Material: cordierite
  Shape: flow-through honeycomb structure
Drying and Calcination Conditions
  Drying temperature: 120° C. (air)
  Drying time: 1 hour
  Calcination device: electric furnace
  Calcination temperature: 450° C.
  Calcination time: 30 minutes

TABLE 2

|  | Composition | Content (g/L) |
|---|---|---|
| Upper Layer | Fe and Ce ion-exchanged β zeolite | 75 |
|  | $Al_2O_3$ | 7 |
|  | Binder | 8 |
| Lower Layer | Pt | 4.5 |
|  | $CeO_2$ | 60 |
|  | Ce—Pr—La—Ox | 60 |
|  | Zr—Nd—Ox | 20 |
|  | $Al_2O_3$ | 30 |

Test Example 1

Figure 9:
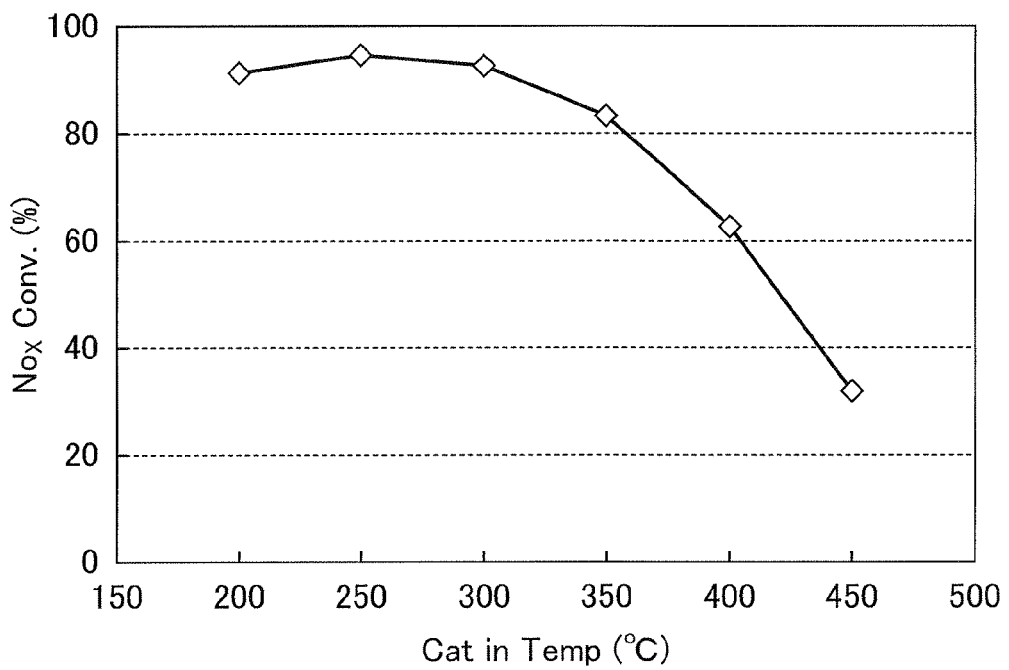
FIG. 9 is a view showing characteristics of a NOx conversion rate with respect to a catalyst temperature in Example 1.

The catalyst formed in Example 1 was operated under the operation conditions described below to evaluate NOx reduction performance. The results are shown in FIG. 9. The horizontal axis in FIG. 9 represents catalyst temperature and the vertical axis represents conversion rate of NOx (volume %).
[Test Condition]
Measurement Conditions
  Catalyst Temperature: A total of six points of 200° C., 250° C., 300° C., 350° C., 400° C., and 450° C.
  Proportion of lean-condition to rich-condition: 55 sec/5 sec
Gas Conditions
  Lean condition: 6% $O_2$, 6% $CO_2$, 500 ppm $C_3H_6$ 900 ppm CO, 110 ppm NO, 7% $H_2O$, $N_2$ balance
  Rich condition: 0% $O_2$, 6% $CO_2$, 500 ppm $C_3H_6$, 2% CO, 110 ppm NO, 7% $H_2O$, $N_2$ balance As is apparent from the results shown in FIG. 9, in the control method in the NOx purifying system of the present invention using the catalyst as prepared in Example 1, NOx conversion of more than 80% was achieved by the rich/lean control under low-temperature operating conditions ranging from 200° C. to 350° C., indicating that the catalyst is superior particularly in NOx purification performance under low-temperature operating conditions.

Example 2

The test was conducted under test conditions similar to those in Example 1, except that the catalyst temperatures were set to five total points of 170° C., 200° C., 250° C., 300° C., and 400° C.

Comparative Example 1

The test was conducted under test conditions similar to those in Test Example 1, except that the NOx absorbent catalyst as disclosed in Japanese Document 1 (composition: Pt/Rh (Pt/Rh=5/1)+Ba, K, Ce—Zr+$TiO_2$) was used.

Test Example 2

Figure 10:
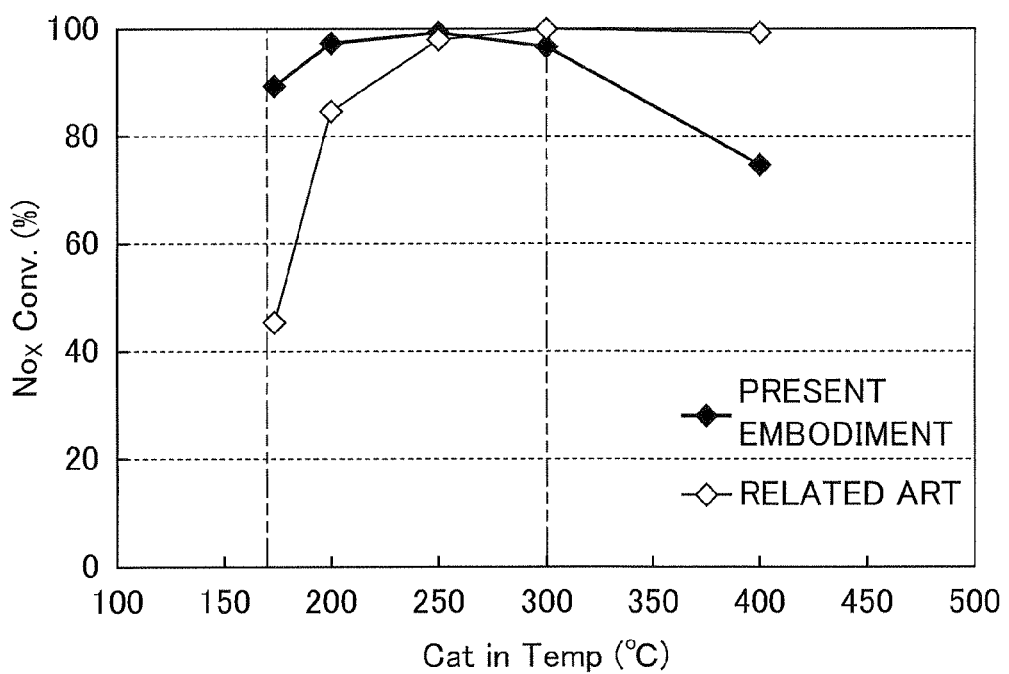
FIG. 10 is a comparative view showing the NOx conversion rates of Example 2 and Comparative Example 1 with respect to a catalyst temperature.

The test results of the above Example 2 and Comparative Example 1 are shown in FIG. 10. Here, the horizontal axis in FIG. 10 is catalyst temperature, and the vertical axis is conversion rate of NOx (volume %). As is apparent from the results shown in FIG. 10, in the control method of the NOx reduction system of the present invention, NOx conversion of more than 80% was achieved by the rich/lean control at the low temperatures ranging from 200° C. to 350° C., indicating that the catalyst is superior particularly in NOx purification performance under low-temperature operating conditions. In contrast, the NOx conversion under low-temperature operating conditions below 250° C. of the catalyst of Comparative Example 1 is much lower than that of the catalyst of Example 2, indicating that the NOx purifying performance of the catalyst of the Comparative Example 1 at operation temperatures below 250° C. is insufficient.

The invention claimed is:

1. A control method of a NOx reduction system for treating NOx contained in exhaust gas from an internal combustion engine including:
   a NOx treatment means disposed in an exhaust passage from the internal combustion engine; and
   an air-fuel ratio control means for adjusting an air-fuel ratio of the exhaust gas to lean or rich; wherein
   the NOx treatment means comprises at least a first catalyst layer including a solid acid catalyst capable of adsorbing ammonia and a second catalyst layer including a noble metal and a cerium oxide-based material, the second catalyst layer and the first catalyst layer being stacked in that order on a carrier, the first catalyst layer configuring the uppermost layer, and the second catalyst layer is configured such that the content of the noble metal decreases gradually or stepwise from the first catalyst layer to the carrier, and wherein
   the control method of a NOx reduction system is characterized in that the air-fuel ratio control means is controlled in order to repeat at predetermined intervals the following Steps A and B of:
   Step A: the air-fuel ratio control means making a lean condition, thereby making the NOx adsorb onto the second catalyst layers while being oxidized by the second catalyst layer (Step A1), and ammonia adsorbed onto the first catalyst layer in Step B being reduced to nitrogen and released (Step A2); and
   Step B: the air-fuel ratio control means making a rich condition, thereby converting NOx adsorbed in the Step A1 to ammonia by the second catalyst layer, and adsorbing the ammonia to the first catalyst layer.

2. The control method of the NOx reduction system according to claim 1, wherein the solid acid catalyst of the first catalyst layer is a zeolite-based catalyst.

3. The control method of the NOx reduction system according to claim 1, wherein the first catalyst layer further comprises at least one of an iron element and a cerium element.

4. The control method of the NOx reduction system according to claim 1, wherein the cerium oxide-based material in the second catalyst layer is at least one of a cerium oxide and a composite oxide of cerium and a rare earth element.

5. The control method of the NOx reduction system according to claim 1, wherein the second catalyst layer further contains heat-resistant inorganic oxide.

6. The control method of the NOx reduction system according to claim 5, wherein the heat-resistant inorganic oxide is at least one material selected from the group consisting of a zirconium oxide-based material, alumina-based material, zeolite-base materials, and silica-based material.

7. The control method of the NOx reduction system according to claim 6, wherein the zirconium oxide-based material is at least one of a zirconium oxide and a composite oxide of zirconium and a rare earth element.

8. The control method of the NOx reduction system according to claim 1, wherein the internal combustion engine is a diesel engine.

9. The control method of the NOx reduction system according to claim 8, wherein a three-way catalyst (TWC), a diesel particulate filter (DPF), and the NOx treatment means are arranged in this order toward an exhaust direction of the exhaust passage, the NOx treatment means being separated from a diesel engine and arranged at a position that does not substantially receive a heat effect thereof.

10. The control method of the NOx reduction system according to claim 8, comprising a temperature adjusting means capable of adjusting a temperature of the NOx treatment means to no greater than 400° C.

* * * * *